Sept. 5, 1967  A. M. ALPER ET AL  3,340,076
FUSED REFRACTORY CASTINGS
Filed May 3, 1966
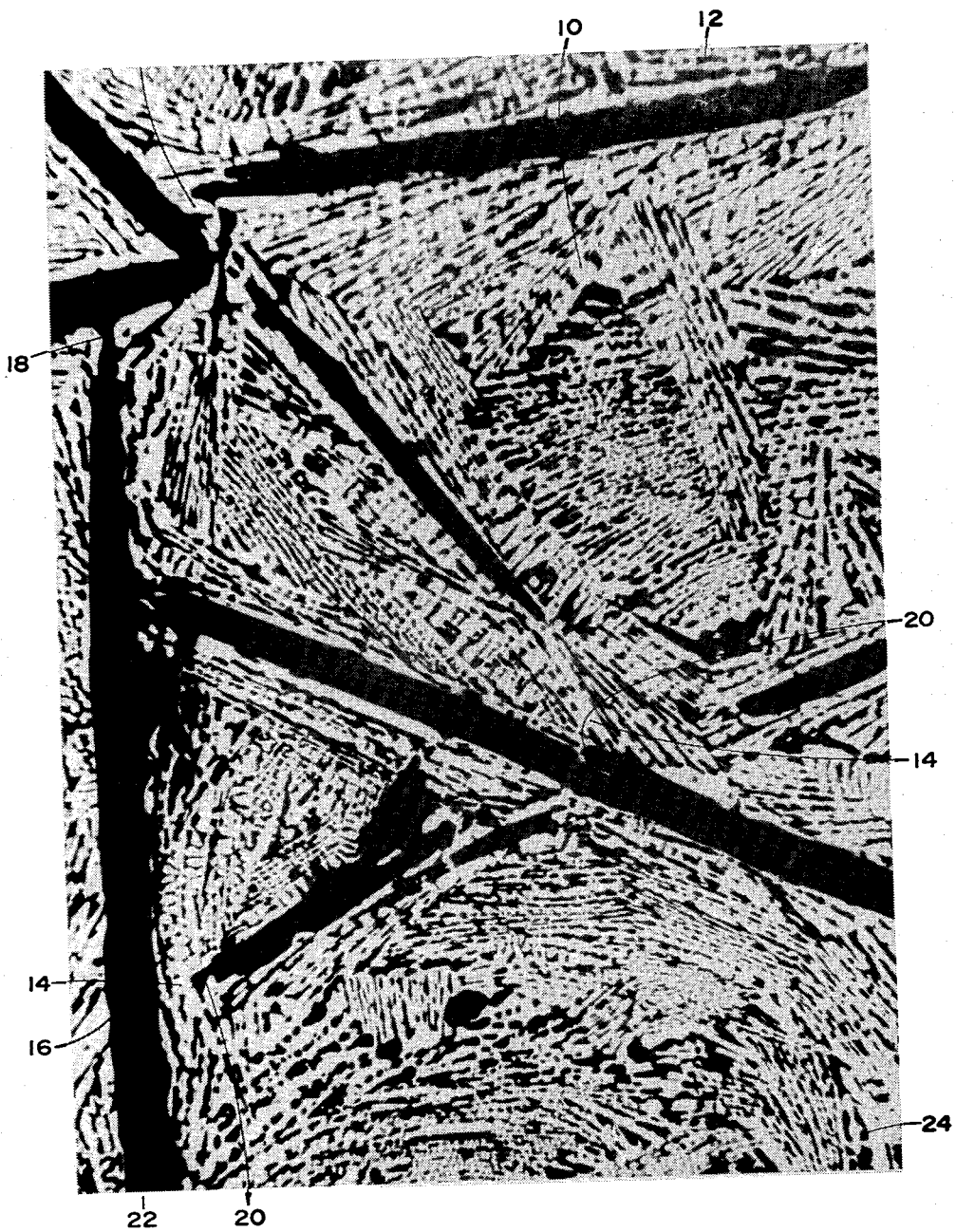
INVENTORS
Allen M. Alper
Robert C. Doman
Robert N. McNally
By Clarence R. Patty Jr.
ATTORNEY 3,340,076
FUSED REFRACTORY CASTINGS
Allen M. Alper, Corning, Robert C. Doman, Horseheads, and Robert N. McNally, Corning, N.Y., assignors to Corning Glass Works, Corning, N.Y., a corporation of New York
Filed May 3, 1966, Ser. No. 554,618
23 Claims. (Cl. 106—56)

This is a continuation-in-part of abandoned application Ser. No. 395,845, filed Sept. 11, 1964.

This invention relates to refractory ceramic castings, commonly known as fused cast refractory, produced by melting refractory ceramic raw material and pouring the molten material into preformed molds to solidify as monolithic castings therein. As a principal feature, the invention relates to novel fused cast carbide-carbon refractory castings exhibiting highly superior resistance to thermal or heat shock by virtue of a special microstructure, particularly with regard to the distribution, shape and arrangement of free carbon or graphite, that is generally homogeneous throughout the castings. These castings are also characterized by good oxidation resistance, when compared to graphite, high strength at room and elevated temperatures, and good electrical and thermal conductivity. Furthermore, the invention relates to novel fused cast carbide-carbon refractory castings exhibiting a high degree of resistance to corrosion and erosion by ferruginous high-lime steelmaking slags in reducing atmosphere environments, which indicates their suitability for lining parts of basic oxygen steelmaking furnaces employed in processes such as the LD process and the Kaldo process. Of course, these castings may be employed for many other uses, for example, such as lining parts of blast furnaces and furnaces for manufacturing aluminum, electrodes in metallurgical furnaces, electrical resistance heating elements and electrical induction furnace susceptors.

Heretofore it has been well known to produce friable masses of crude metal carbides by reacting suitable raw materials at elevated temperatures that may or may not cause melting of the material. These friable masses have been formed in situ in the electric furnace used for their production and are subsequently crumbled to granular masses, which are then used as abrasives or are rebonded by known techniques (not involving complete melting and solidification as monolithic castings) to form highly refractory bodies for a variety of purposes as is well known in the art. Although in some cases, prior friable masses of crude metal carbides have been produced with free carbon, efforts were mostly made to eliminate such free carbon in the granular materials because it caused difficulties in producing proper abrasive material, or the free carbon in the granular material was further reacted with a carbide-forming element during a rebonding process to form a carbide bonded body. Moreover, from our knowledge of prior crude metal carbide masses containing free carbon, made either as a solid state reacted and sintered mass or as a fused regulus, their microstructures appear to be highly variably with considerable inhomogeneity and segregation with respect to the distribution, shape and arrangement of the free carbon, thereby yielding low quality and high variability in properties such as thermal shock resistance, strength, corrosion resistance, and electrical and thermal conductivities. Such highly variable microstructures are apparently due to the processes of in situ formation of these masses and, of course, such variability would not be of much concern in producing crushed granular material from which the free carbon is to be removed or otherwise disposed of.

Prior to our invention as described herein, to our knowledge, no one has formed the fused cast refractory castings defined below and in the claims, nor, as a result, have they recognized the great technological benefits to be gained thereby, namely in particular, highly refractory bodies possessing a highly superior resistance to thermal shock and, in many cases, a high degree of resistance to corrosion-erosion by steel-making slag in a carbon monoxide atmosphere.

Modern day technologies continue increasingly to create greater demand for materials that will withstand high and suddenly encountered temperatures. We have now discovered fused cast refractory castings of novel composition and structure that will help meet this continuing demand. Hence, it is a principal object of this invention to provide highly refractory castings of fused cast metallic carbide-carbon refractory possessing thermal shock resistance superior to that of any fused cast refractory castings produced heretofore to our knowledge.

Although the commercial popularity of the basic oxygen steel-making processes continues to grow, the problem of relatively rapid consumption of refractory material making up the linings in the furnaces or vessels for these processes continues to seriously hinder the much desired economy of operation and output. Our data indicates that the lining life of basic oxygen vessels may be improved by employing some of the castings of this invention to form parts of such linings, such as in the barrel sections of the vessels.

The present invention is an article of manufacture that can be generally defined as a fused cast refractory casting consisting essentially of at least 5% (preferably at least 11%) by weight of free carbon or graphite in the form of a random interwoven pattern or intertexture intermingling and interlocking with substantially randomly oriented metallic carbide crystals, and the casting analytically comprises essentially carbon and at least 20% by weight of metallic carbide-forming substance as set forth below. While these are the only two essential analytical components of the casting, certain other optional analytical components may be included as noted below and as desired according to the raw materials used, the processing conditions employed and the precise properties desired in the final casting product.

While the amount of free carbon or graphite, broadly speaking, can be as low as 5% by weight, this limit tends to include some casting compositions possessing only the minimal improvement in thermal shock resistance that is possible with this invention. For assurance of castings with outstandingly superior thermal shock resistance, the free carbon or graphite should be no less than 15% by weight.

Even more distinctly unique are castings with free carbon or graphite in excess of 35% by weight because they exhibit a vastly superior thermal shock resistance in contrast with the castings having much less free carbon or graphite and because they are comparable to pure graphite for many applications, but without having certain disadvantages of the latter material. For example, these very high graphite content castings are superior to pure graphite in that they have greater strength, greater oxidation resistance, and, in many cases, greater corrosion and/or erosion resistance.

The analytical metallic carbide-forming substance can be composed of one or more metallic elements now to be described. Where only a single metallic element is employed to form the carbide crystals, this element is selected from the group consisting of titanium, zirconium, hafnium, vanadium, niobium, tantalum, chromium, molybdenum and tungsten. Any mixture of two or more of the foregoing metals can also be employed to form one or more metallic carbide phase or phases depending upon the degree of mutual solid solution solubility of one such carbide in the other carbide or carbides. Also, the analytical metallic carbide-forming substance may be composed of mixtures comprising any one or more of the above-described first group of metals plus at least one metallic element selected from a second group consisting of silicon, manganese, iron, cobalt and nickel, provided the content of the metals of the first group is not less than 10% by weight of the total casting nor less than the content by weight of the second group of metallic elements. In the case of the latter mixtures, one or more metallic carbide phases will also be formed depending upon the degree of mutual solid solubility of one carbide in the other carbide or carbides.

The optional analytical components permissible in the castings according to this invention may be categorized as diluents and/or impurities. Oxygen and nitrogen are here categorized as diluents, although in some cases they may be in a sense deemed impurities while in other cases they may be deemed desirable additives. Each of oxygen and nitrogen should not analytically exceed 10% by weight of the casting and the total sum of oxygen plus nitrogen should not analytically exceed 15% by weight of the casting. The casting may also contain analytically, as a remainder, other elements up to .5% by weight as impurities. Such impurities will commonly result from the use of less pure raw materials and can include elements such as aluminum, alkali metals, alkaline earth metals, rare earth metals, sulfur and phosphorus.

In connection with the further detailed description of this invention, reference will be made to the sole figure of the drawing, which is a photomicrograph of a typical microstructure according to the present invention.

Unlike wholly silicon carbide material, the refractory material for the present invention can be readily melted without the excessive sublimation that occurs when attempts are made to melt silicon carbide. This is due to the substantially lower vapor pressure characteristics of the carbide materials employed in this invention. The raw materials preferably are either a mixture of the appropriate metallic carbide and carbon or graphite, or a mixture of the appropriate metal and/or metal oxide with an excess amount of carbon to form the corresponding carbide and free carbon (graphite). These mixtures can be melted in either a conventional electric arc melting furnace employing graphite electrodes or in an electric induction melting furnace employing a graphite lining or pot. In order to avoid excessive oxidation of the charge by the ambient air, appropriate measure should be taken to cover the batch material during the entire heating operation, for example, by maintaining a neutral or reducing atmosphere in contact with the top exposed surface of the charge or by providing an appropriate loose fitting crown or cover over the top opening of the furnace. It is preferred to premix the batch material before charging into the furnace and, when employing mixtures containing the metal and/or metal oxide, it has been found preferable to agglomerate the batch mixture into pellets before charging into the furnace. Without this previous agglomeration, incomplete reaction and segregation may occur with an excessive amount of oxides and free metal being left in the melt. The pellets should be heated to a temperature sufficient to cause the reaction to form the carbide, but insufficient to cause melting, in order to economize on the amount of electric power used and to minimize the amount of volatilization of the batch materials. When the gas evolution and flaming has substantially ceased, the batch materials are melted in the customary way as are the initial batch mixtures of carbide and carbon to form a molten pool contained within a surrounding mass of unreacted batch materials as a protective liner to prevent contamination of the molten bath. Some of the carbon content of the molten product is obtained from the graphite electrodes or the graphite liner and, therefore, the amount of carbon employed in the batch mixture is kept less than the total amount of carbon necessary to form the particular composition desired. No precise rule of proportioning can be specified as the amount of carbon from either source will vary depending upon such factors as time, temperature, etc. In any event, the appropriate proportioning can be readily determined by those skilled in this art by minimal trial experience.

After an appropriate quantity of molten batch material has been formed, the molten mass is poured into a graphite mold surrounded in the conventional manner with annealing powder, such as, alumina powder, powdered coke, etc., and allowed to solidify therein to form a monolithic casting of fused cast refractory having the shape of the mold cavity. This procedure produces relatively rapid solidification yielding substantially random shaped carbide crystals that are substantially randomly oriented (i.e. at least 40% by weight of the crystals) and that are of relatively medium-to-fine grain size. The free carbon or graphite forms a random (and, in many cases, discontinuous when graphite is about 5–35 wt. percent) interwoven pattern, or intertexture intermingling with the carbide crystals. The free carbon or graphite are also bonded to the carbide crystals. The free carbon or graphite are also bonded to the carbide crystals in an interlocking manner that is typical of fused cast refractory. The microstructures of the castings according to this invention will be better understood by reference to the sole figure of the accompanying drawing. The illustrated microstructure is that of Example No. 18 shown in Table I below. The light areas 10 are randomly shaped and oriented zirconium carbide crystals. The random and discontinuous interwoven pattern or intertexture of free carbon (graphite) is the dark appearing areas 12. The crystal bonding is carbide-to-carbide 14, carbide-to-graphite 16 and graphite-to-graphite 18. The carbide-to-graphite bonds form irregular boundaries of an interlocking nature, such as is shown at 20. The large graphite areas 22 are primary graphite blades formed between the carbide crystals and the smaller graphite areas 24 appear to be a eutectic or similar structure, or exsolved (precipitated) graphite within the carbide crystals. Sometimes the smaller graphite areas tend to be dendritic in shape.

The following example will better illustrate the practice of this invention and the novel results obtained therefrom. A comminuted batch mixture was prepared containing 60% by weight of ilmenite ore and 40% by weight electrode grade graphite. The ilmenite ore had the following typical analysis by weight: 63.14% $TiO_2$, 31.7% $Fe_2O_3$, 0.5% $Al_2O_3$, 0.4% MgO, 0.3% $SiO_2$, 0.12% $Cr_2O_3$. This mixture was combined with a small amount of water and starch, and then agglomerated into small pellets. The pellets were charged into an electric arc melting furnace covering the lower ends of the graphite electrodes, between which graphite shorting bars had been placed. A loosely fitting graphite crown cover was placed over the top of the furnace chamber and the electric power was turned on to a level sufficient to cause the batch materials to react with each other but without any substantial melting. The beginning of the reaction is readily evidenced by the gas evolution and flaming occuring up around the openings in the graphite crown cover. When the flaming and gas evolution had substantially subsided, the power was increased to melt a substantial proportion of the reacted charge sufficient to fill a graphite mold having a cavity shape of a brick 3″ x 4½″ x approximately 13″ plus the usual font header. The furnace was tapped and the molten material was quickly poured into the mold, which was surrounded by alumina annealing powder. The top of the font header was also covered over with alumina annealing powder and the mold was allowed to stand until the brick casting had cooled substantially to room temperature. The chemical analysis of the casting was as follows, by weight: 54.0% titanium, 17.3% iron, less than 1% oxygen, balance carbon. The X-ray analysis of the casting showed the predominant phase to be TiC with a smaller amount of iron carbide crystals and an intertexture of graphite intermingling and interlocking with the carbide crystals. The graphite was estimated at an excess of 5% by weight of the casting.

The highly superior thermal shock resistance of the foregoing example was demonstrated by cutting an approximately 1″ x ¾″ x ½″ sample from the casting, heating the sample to 1800° C., and then dropping the sample in water at room temperature. This procedure constitutes one cycle of this severe test. In the case of this sample, the test cycle was repeated five times without any detectable thermal shock fracturing occurring. Another sample of the same casting and of the same size was subjected to three cycles without any detectable thermal shock fracturing.

In contrast to the foregoing samples of this invention, the following completely melted and solidified refractory examples (not within this invention) illustrates the important critical effect of the amount of free carbon (or graphite) on thermal shock resistance. The comminuted and agglomerated batch was composed of 83% by weight of titanium metal (99.3 wt. percent Ti) and 17% by weight of carbon black. The solidified arc-melted product had a phase analysis, as determined by conventional point count technique, of 96.4% by weight TiC and 3.6% by weight free graphite. The chemical analysis, as computed from the phase analysis, was 77.1% by weight titanium and 22.9% by weight carbon. Upon being subjected to the above-described thermal shock resistance test, a sample of this product fractured during the third cycle. Thus it is readily apparent that at least 5% by weight of free carbon or graphite is necessary for the highly superior thermal shock resistance of this invention.

The results of the above-described titanium carbide-iron carbide-graphite casting of this invention can be compared with the results of this test on a commercial fused cast refractory that, to our knowledge, exhibited the highest degree of thermal shock resistance heretofore. The latter refractory is a fused and cast mixture of (by weight) 98.81% alumina, 0.52% quicklime and 0.67% fluorspar, and an identical sized sample shattered into about three pieces on the second cycle of the above-described thermal shock test.

Another fused cast refractory that was previously noted for its resistance to severe thermal shock is that of fused cast pure magnesium oxide castings having a crystalline texture consisting of at least 75 volume percent of equant, unoriented, periclase crystals with a majority of these crystals having a fine-to-medium grain size ranging from 20 to 5,000 microns. Identical size samples of these magnesia castings shattered into two or three pieces on the first or second cycle of the above-described thermal shock test.

In order to demontsrate the improved slag resistance of some castings according to this invention under reducing atmosphere conditions, the following test was conducted for samples of this invention as well as of prior art materials, two of which are more commonly used for basic oxygen furnace linings. The test comprised placing 1½″ x 1″ x ½″ samples in an induction furnace adapted to approximate the temperature and reducing atmosphere of a basic oxygen furnace. At 1700° C. for 2½–3 hours, the samples were passed, with one of their largest surfaces facing upward, through a downwardly directed stream of molten high-lime basic ferruginous slag droplets at a substantially uniform rate of 60 times per hour. The slag was representative of the basic oxygen furnace slag developed during the production of a heat of steel and had the following batch composition, by weight: 23.75% $Fe_2O_3$, 25.94% $SiO_2$, 40.86% CaO, 6.25% MgO and 3.20% $Al_2O_3$. At the end of the test, the average thickness of the samples were measured and compared with the original ½″ thickness prior to testing. The results are expressed as a percentage change in thickness (called percent slag cut). For three samples of the above-described titanium carbide-iron carbide-graphite casting, the slag cut was 17–35%. In contrast, a sample of more conventional tar bonded dolomite brick exhibited a slag cut of 100% (i.e. the sample was completely cut in half). Samples of a common commercial fused cast basic refractory made from a mixture of essentially 55% magnesite and 45% chrome ore exhibit slag cuts of 50–100%. The refractory castings of this invention compare favorably with another recently developed fused cast basic refractory for basic oxygen furnace linings because of its good slag resistance in reducing atmosphere conditions. This latter refractory is a fused and cast mixture of 90% by weight magnesite and 10% by weight rutile, and it exhibits a slag cut of 25–30% in the above-described test. It is also interesting to note the comparison of graphite (electrode grade) in the above-described test. A series of ten samples of graphite exhibited slag cuts of 24–45%.

The above-noted titanium carbide-iron carbide-graphite casting has also been found to possess reasonably good resistance to attack by molten iron. A sample like that used in the above-described slag resistance test was immersed in molten iron contained in a graphite crucible at 1750° C. for ½ hour. The molten iron cut was 19% and our experience with this test indicates that molten iron cuts of 20% or less are indicative of reasonably good resistance to molten iron corrosion.

The titanium carbide-iron carbide-graphite casting also exhibits several other notable properties. Its modulus of rupture (in flexure) at 1340° C. is 2000–6000 p.s.i. Samples of the casting showed no significant deformation (i.e. less than 5%) under 25 p.s.i. compressive load up to 2200° C. Also, it exhibits a fairly low coefficient of thermal expansion for such highly refractory materials, namely, less than $85 \times 10^{-7}$ per °C. at 1000° C.

The detrimental effect of excessive amounts of impurities was demonstrated during the production of additional castings from the above mixture of 60% by weight ilmenite and 40% by weight carbon when one of the castings was contaminated by alumina annealing powder during pouring. The chemical analysis was as follows, by weight: 47.8% titanium, 16.2% iron, 8.8% oxygen, 9.8% aluminum, balance carbon. The corrosion resistance to the molten high-lime basic slag and to the molten iron contained in a graphite crucible was very poor and within a short time samples of this casting disintegrated while merely setting on the shelf.

Other examples of batch compositions that can be melted to provide castings according to this invention are shown for purposes of further illustration in Tables I, III, V and VII. Most of these examples have been satisfactorily melted in an electric induction furnace (as noted above). However, examples Nos. 2, 3, 13, 14, 20, 21, 29, 34, 46, 76, and 92 are illustrative of batch compositions that have been satisfactorily melted in an electric arc furnace (as above noted). The property data shown in these tables are for the results from the thermal shock resistance test, the slag resistance test and the molten iron immersion test as previously described above. All these compositions and analytical data in these four tables as well as in Tables II, IV, VI and VIII are given in percent by weight. The typical representative chemical analyses of the raw batch materials used are as follows, by weight:

Ti (Titanium sponge):
    99.3% Ti, 0.30% max. Mg. 0.1% max. Fe, 0.15% max. Cl.
$TiO_2$ (rutile):
    96–98% $TiO_2$, 1% max. $Fe_2O_3$, 0.3% $ZrO_2$, 0.3% $Al_2O_3$, 0.25% $SiO_2$, 0.1% $Cr_2O_3$, 0.29% $V_2O_5$, 0.025–0.05% $P_2O_5$, 0.1% S.
TiN (titanium nitride):
    99+% TiN.
Zr (zirconium sponge):
    99.2% min. Zr+Hf (Hf approx. 2%), 0.2% max. Cr+Fe.

Hf (pure metal):
    99+% Hf.
$ZrSiO_4$ (zircon ore):
    67.23% $ZrO_2$ ($HfO_2$ approx. 2%), 32.40% $SiO_2$, 0.18% FeO, 0.18% $TiO_2$.
V (pure metal):
    99+% V.
Nb (pure metal):
    99+% Nb.
T.C.O. (Transvaal chrome ore):
    43.77% $Cr_2O_3$, 23.28% FeO+$Fe_2O_3$, 13.00% $Al_2O_3$, 11.79% MgO, 3.24% $SiO_2$, 0.5% CaO, 0.4% $TiO_2$.

TABLE I

| No. | Batch Mixture Composition | Phase Analysis* | Percent Slag | Percent Fe Cut | Thermal Shock Cycles† |
|---|---|---|---|---|---|
| 1 | 85% Ti, 15% C | 84.0% TiC, 16.0% G | 7 | | |
| 2 | 81% Ti, 19% C | 90.9% TiC, 9.1% G | | | 5 |
| 3 | 81% Ti, 19% C | 84.3% TiC, 15.7% G | | | 18 |
| 4 | 80% Ti, 20% C | 86.9% TiC, 13.0% G, 0.1% Fe | | 11 | >8 |
| 5 | 75% Ti, 25% C | 81.0% TiC, 19.0% G | 2 | | |
| 6 | 70% Ti, 30% C | TiC, >>5% G | | 14 | |
| 7 | 60% Ti, 40% C | 79.1% TiC, 20.9% G | | | >20 |
| 8 | 50% Ti, 50% C | 54.1% TiC, 45.9% G | | | >50 |
| 9 | 40% Ti, 60% C | TiC, >>5% G | | | |
| 10 | 65% Ti, 20% $TiO_2$, 15% C | TiC, >>5% G | | | |
| 11 | 49% Ti, 30% TiN, 21% C | TiC, >>5% G | | | 4 |
| 12 | 75% $TiO_2$, 25% C | TiC, >>5% G, α Fe | | | |
| 13 | 40% $TiO_2$, 60% C | TiC, >>5% G | | | |
| 14 | 70% $TiO_2$, 30% coal | TiC, >5% G, $TiO_2$ | | | |
| 15 | 88% Zr, 12% C | 84.5% ZrC, 15.5% G | 20 | 26 | 3 |
| 16 | 83% Zr, 17% C | 75.3% ZrC, 24.7% G | | | 7 |
| 17 | 75% Zr, 25% C | 85.7% ZrC, 14.3% G | | 29 | 7 |
| 18 | 60% Zr, 40% C | 86.0% ZrC, 14.0% G | | | >8 |
| 19 | 50% Zr, 50% C | 62.5% ZrC, 37.5% G | | | |
| 20 | 50% $ZrO_2$, 50% C | ZrC, >>5% G | | | |
| 21 | 77.4% $ZrO_2$, 22.6% coal | ZrC, >5% G, $ZrO_2$ | | | |
| 22 | 81% $HfO_2$, 19% C | HfC, >5% G | | | |
| 23 | 77.5% $HfO_2$, 22.5% C | 90.1% HfC, 9.9% G | | | |
| 24 | 70% $V_2O_5$, 30% C | VC, >5% G | | | |
| 25 | 77.5% $Nb_2O_5$, 22.5% C | NbC, >5% C | | | |
| 26 | 66% $Nb_2O_5$, 34% C | NbC, >>5% C | | | |
| 27 | 70% $Ta_2O_5$, 30% C | TaC, >>5% C | | | |
| 28 | 76% Ta, 24% C | TaC, >5% G | | | |
| 29 | 50% $Cr_2O_3$, 50% C | $Cr_3C_2$, >>5% G, $Cr_7C_3$ | | | |
| 30 | 80% $Cr_2O_3$, 20% C | $Cr_3C_2$, >5% G | | | |
| 31 | 60% Mo, 40% C | MoC, $Mo_2C$, >>5% G | | | |
| 32 | 70% Mo, 30% C | MoC, >5% G | | | |
| 33 | 80% W, 20% C | WC, >5% G | | | |
| 34 | 50% $WO_3$, 50% C | WC, $W_2C$, >>5% G | | | |

*The symbol G designates graphite phase.
†The symbol > indicates test stopped at designated number of cycles without fracture occurring.

$ZrO_2$ (zirconia):
    94.15% $ZrO_2$, 2.00% $HfO_2$, 1.00% max. $Al_2O_3$, 0.8% max. $SiO_2$, 0.75% max. CaO, 0.50% max. $Fe_2O_3$.
$HfO_2$:
    97+% $HfO_2$ (Zr approx. 2%)
$V_2O_5$:
    99+% $V_2O_5$.
$Nb_2O_5$ (optical grade):
    99.9+% $Nb_2O_5$.
$Ta_2O_5$ (optical grade):
    99.9+% $Ta_2O_5$.
Ta (high purity metal):
    99+% Ta
$Cr_2O_3$ (green chromic oxide):
    99.75+% $Cr_2O_3$.
Mo (high purity metal):
    99+% Mo.
W (high purity metal):
    99+% W.
$WO_3$ (scheelite concentrate):
    68–72% $WO_3$ (balance probably CaO).
Fe (pure metal):
    99+% Fe.
$FeTiO_3$ (ilmenite):
    (As described above.)
Cr (pure metal):
    99+% Cr.
Si (pure metal):
    99+% Si.
Mn (pure metal):
    99+% Mn.

The data in Table I is illustrative of single metal carbide-graphite compositions and it is readily evident that the substantial amount of at least 5% by weight of free carbon (graphite) in the microstructure is accompanied by superior thermal shock resistance. Examples Nos. 3, 7 and 16 illustrate the outstandingly superior thermal shock resistance that is obtainable when the free carbon or graphite is at least 15% by weight or more. The reason for the low thermal shock resistance of example No. 15 is not known, but apparently was caused by some structural defect, as can occur occasionally among a group of manufactured castings. Examples Nos. 4 and 18 show that it is occasionally possible to obtain the outstandingly superior thermal shock resistance with slightly less than 15% by weight of free carbon or graphite, but below this latter level of free carbon or graphite, we have not found such excellent shock resistance to be commonly obtainable.

Example No. 8 illustrates the vastly superior thermal shock resistance that is obtainable when the free carbon or graphite exceeds 35% by weight. This example contained a very large amount of uniformly distributed and interwoven primary graphite blades, most of which appeared to be interconnected (graphite-to-graphite bonding), and which were interlocked with a matrix composed of titanium carbide and smaller graphite areas that were well intermixed and interwoven. Also notable is the fact that graphite contents in excess of 35% by weight, as in example No. 8, provide the products with extremely high melting points in excess of about 3200° C.

The titanium carbide-graphite samples in Table I were noted particularly to be resistant to corrosion by the molten slag and iron in the above noted tests. While the zirconium carbide-graphite samples were not as corrosion resistant as the titanium carbide-graphite samples in the same tests, nevertheless they show a fair resistance to slag corrosion.

As was previously noted above, not all the carbon content in the casting will be derived from the batch mixture, but some will come from the graphite electrodes or the graphite container. The chemical analyses data shown in Table II illustrates very clearly this fact. Moreover, the latter data, along with the data of Table I, gives a reasonably good indication of proportioning required in the batch mixtures for producing a particular desired composition in the casting.

TABLE II

| No. | Actual Analysis | Calculated Analysis* |
|-----|-----------------|----------------------|
| 1 | 66.5% Ti, 33.3% C, 0.2% Fe | 67.2% Ti, 32.8% C. |
| 2 | | 72.2% Ti, 27.3% C. |
| 3 | | 67.4% Ti, 32.6% C. |
| 4 | 69.5% Ti, 30.4% C, 0.1% Fe | 64.8% Ti, 35.2% C. |
| 5 | | 63.2% Ti, 36.8% C. |
| 7 | | 43.3% Ti, 56.7% C. |
| 8 | | 74.7% Zr, 25.3% C. |
| 15 | 79.0% Zr, 21.0% C | |
| 16 | 66.5% Zr, 33.5% C | |
| 17 | | 76.0% Zr, 24.0% C. |
| 18 | 76.0% Zr, 24.0% C | |
| 19 | | 55.2% Zr, 44.8% C. |
| 20 | | 84.4% Hf, 15.6% C. |

\* On basis of phase analysis in Table I assuming no excess carbon in solid solution in the carbide phase.

It is further notable that castings according to this invention can possess high strength at room and elevated temperatures. A casting analyzing 68.3 wt. percent Ti and 31.7% C. was found to have an average modulus of rupture (in flexure) of slightly in excess of 14,000 p.s.i. at room temperature and of slightly in excess of 12,000 p.s.i. at 1340° C.

The examples shown in Tables III and V are illustrative of compositions employing two carbide-forming metallic substances, which in turn result in the formation of one or more carbide phase or phases, as shown in Tables IV and VI. Again the data confirms the fact that the presence of at least 5% by weight of graphite is accompanied by superior thermal shock resistance in all cases and that outstandingly superior thermal shock resistance is obtainable when graphite is at least 15% by weight (for example, see examples Nos. 47 and 49).

Although not all the examples in Tables III and V exhibit superior resistance to the molten slag and iron in the above noted tests, the titanium-iron-carbon, titanium-zirconium-carbon and zirconium-chrome-carbon samples were generally found among these examples to have the best corrosion resistance to the molten slag and iron in such tests. The titanium-iron-carbon examples of Tables III and IV with less than 10 wt. percent analyzed iron indicate a desirable fused cast refractory casting material for lining portions of basic oxygen furnaces and which castings can be made from relatively inexpensive raw materials such as ilmenite and graphite. Moreover, the inclusion of iron in the composition will reduce the melting point of the mixture and make the casting more easily manufacturable without detriment to the desired superior properties. While the approximate melting point of a batch mixture of 80% Ti–20% C. is in excess of 3000° C., the approximate melting point of 65% Ti–15% Fe–20% C. is 2500° C. Concerning the iron-containing examples, it will be noted that a considerable amount of iron is lost during the melting process as will be seen by reference to the chemical analyses data in Table IV.

This data is a good indication of the batch material proportioning required to provide the proper composition analysis of castings according to this invention.

TABLE III

| No. | Batch Mixture Composition | Percent Slag Cut | Percent Fe Cut | Thermal Shock Cycles |
|-----|---------------------------|------------------|----------------|----------------------|
| 35 | 75% Ti, 5% Fe, 20% C | | | 4 |
| 36 | 70% Ti, 10% Fe, 20% C | 4–18 | 26 | >8 |
| 37 | 65% Ti, 15% Fe, 20% C | | | 5 |
| 38 | 60% Ti, 20% Fe, 20% C | 21 | | |
| 39 | 50% Ti, 30% Fe, 20% C | | | 5 |
| 40 | 40% Ti, 40% Fe, 20% C | 35 | | |
| 41 | 60% Ti, 10% Fe, 30% C | 21 | 20 | |
| 42 | 52.5% Ti, 17.5% Fe, 30% C | | | 8 |
| 43 | 40% Ti, 20% Fe, 40% C | 22 | 22 | |
| 44 | 44% Ti, 12% Fe, 44% C | | | >8 |
| 45 | 80% FeTiO₃, 20% C | | | 5 |
| 46 | 50% FeTiO₃, 50% C | | | >8 |
| 47 | 80% Zr, 10% Fe, 10% C | 16 | | >8 |
| 48 | 83% Zr, 5% Fe, 12% C | 20 | | 4 |
| 49 | 63% Zr, 25% Fe, 12% C | 100 | | >8 |
| 50 | 48% Zr, 40% Fe, 12% C | 35 | | |
| 51 | 53.5% Zr, 6.5% Fe, 40% C | | | |

The symbol > indicates test stopped at designated number of cycles without fracture occurring.

TABLE IV

| No. | Phase Analysis* | Chemical Analysis† |
|-----|-----------------|---------------------|
| 35 | | 67.4% Ti, 30.9% C, 1.7% Fe. |
| 36 | 83.2% TiC, 2.3% Fe$_x$C$_y$, 14.5% G | 67.5% Ti, 31.5% C, 1.0% Fe. |
| 37 | 71.5% TiC, 7.4% Fe$_x$C$_y$, 8.7% G | 61.4% Ti, 34.4% C, 4.2% Fe. |
| 38 | | 55.0% Ti, 38.4% C, 6.6% Fe. |
| 39 | | 58.0% Ti, 34.8% C, 7.2% Fe. |
| 40 | | 43.5% Ti, 43.6% C, 12.9% Fe. |
| 45 | TiC, Fe$_x$C$_y$, >5% G, α Fe | |
| 47 | 74.8% ZrC, 7.3% Fe₃C, 17.9% G | 66.1% Zr, 27.1% C, 6.8% Fe. |
| 48 | 79.2% ZrC, 5.2% Fe₃C, 15.6% G | 70.0% Zr, 25.1% C, 4.9% Fe. |
| 49 | 64.1% ZrC, 20.2% Fe₃C, 15.6% G | 56.6% Zr, 24.5% C, 18.8% Fe. |

*The symbol G designates graphite phase.
†Actual.

TABLE V

| No. | Batch Mixture Composition | Percent Slag Cut | Percent Fe Cut | Thermal Shock Cycles† |
|-----|---------------------------|------------------|----------------|-----------------------|
| 52 | 63% Ti, 10% Zr, 27% C | | | >8 |
| 53 | 56% Ti, 20% Zr, 24% C | 20 | | >8 |
| 54 | 32% Ti, 52.8% Zr, 15.2% C | | 6 | |
| 55 | 8.0% Ti, 79.2% Zr, 12.8% C | | 6 | |
| 56 | 20% TiO₂, 70.4% Zr, 9.6% C | | | >8 |
| 57 | 30% TiN, 61.6% Zr, 8.4% C | 12 | | |
| 58 | 52.5% Ti, 25% Cr, 22.5% C | 100 | 7 | >8 |
| 59 | 63% Ti, 10% Cr, 27% C | 51 | 3 | |
| 60 | 44% Ti, 15% Cr, 40% C | | | |
| 61 | 35% Ti, 50% Cr, 15% C | 100 | 18 | |
| 62 | 79.2% Ti, 1% Si, 19.8% C | 15 | | |
| 63 | 77.6% Ti, 3% Si, 19.4% C | | | >4 |
| 64 | 79.2% Ti, 1% Mn, 19.8% C | 16 | | |
| 65 | 77.6% Ti, 3% Mn, 19.4% C | | | >4 |
| 66 | 30% Ti, 40% Hf, 30% C | | | |
| 67 | 15% Ti, 60% Ta, 25% C | | | |
| 68 | 40% Ti, 30% W, 30% C | | | |
| 69 | 81% Zr, 8% Cr, 11% C | 14 | | |
| 70 | 73% Zr, 15% Cr, 12% C | 24 | | |
| 71 | 63% Zr, 25% Cr, 12% C | 11 | | |
| 72 | 81% Zr, 8% Si, 11% C | 24 | | |
| 73 | 72% Zr, 10% Si, 18% C | 10 | 6 | |
| 74 | 69% Zr, 20% Si, 16% C | 22 | 7 | |
| 75 | 48% Zr, 40% Si, 12% C | 21 | 13 | |
| 76 | 50% ZrSiO₄, 50% C | | | |
| 77 | 81% Zr, 8% Mn, 11% C | 20 | | |
| 78 | 20% Zr, 50% Hf, 30% C | | | |
| 79 | 60% Zr, 10% V, 30% C | | | |
| 80 | 30% Zr, 40% Ta, 30% C | | | |
| 81 | 40% Zr, 30% W, 30% C | | | |
| 82 | 35% Hf, 40% Ta, 25% C | | | |
| 83 | 20% Nb, 50% Ta, 30% C | | | |
| 84 | 76% Cr, 5% Fe, 19% C | | | 3 |
| 85 | 35% Mo, 40% W, 25% C | | | |
| 86 | 5% Mo, 70% W, 25% C | | | |

†The symbol > indicates test stopped at designated number of cycles without fracture occurring.

TABLE VI

| No. | Phase Analysis* | Chemical Analysis† |
|---|---|---|
| 58 | | 49.6% Ti, 21.5% Cr, 28.9% C. |
| 59 | | 34.3% Ti, 46.3% Cr, 19.4% C. |
| 66 | (Hf, Ti)C, >5% G | |
| 67 | (Ta, Ti)C, >5% G | |
| 68 | (Ti, W)C, (W, Ti)C, >5% G | |
| 76 | ZrC, SiC, >>5% G | |
| 78 | (Hf, Zr)C, >5% G | |
| 79 | (V, Zr)C, (Zr, V)C, >5% G | |
| 80 | (Ta, Zr)C, >5% G | |
| 81 | (Zr, W)C, (W, Zr)C, >5% G | |
| 82 | (Ta, Hf)C, >5% G | |
| 83 | (Ta, Nb)C, >5% G | |
| 84 | 94.4% Cr₃C₂, 5.6% G‡ | |
| 85 | (W, Mo)C, (Mo, W)C, >5% G | |
| 86 | (W, Mo)C, >5% G | |

*The symbol G designates graphite phase.
†Actual.
‡Trace of Fe in solid solution in Cr₃C₂.

The examples shown in Table VII illustrate a few of the complex combinations of carbide-forming metals that can be provided in castings according to this invention and that will many times produce complex solid solution carbide crystals in the casting, as shown in Table VIII.

TABLE VII

| No. | Batch Mixture Composition | Percent Slag Cut | Percent Fe Cut | Thermal Shock cycles† |
|---|---|---|---|---|
| 87 | 49% Ti, 20% Cr, 10% Fe, 21% C. | 29 | 13 | |
| 88 | 42% Ti, 30% Cr, 10% Fe, 18% C. | 68 | 27 | |
| 89 | 55% FeTiO₃, 30% T.C.O. 15% C. | | | |
| 90 | 40% TiO₂, 35% T.C.O., 25% C. | | | |
| 91 | 30% TiO₂, 45% T.C.O., 25% C. | | | |
| 92 | 30% TiO₂, 10% T.C.O., 60% C. | | | |
| 93 | 52.5% Ti, 5% Cr, 20% Mn, 22.5% C. | | | 5 |
| 94 | 59.9% Ti, 10% Zr, 5% Fe, 25.5% C. | 29 | | |
| 95 | 56% Ti, 10% Zr, 10% Fe, 24% C. | 21 | | |
| 96 | 49% Ti, 20% Zr, 10% Fe, 21% C. | 32 | | |
| 97 | 56% Ti, 10% Zr, 10% Mn, 24% C. | | | >8 |
| 98 | 59.5% Ti, 5% Zr, 10% Mn, 25.5% C. | 31 | | |
| 99 | 49% Ti, 10% Zr, 20% Mn, 21% C. | 39 | | |
| 100 | 5% Ti, 20% Zr, 20% Hf, 20% Ta, 35% C. | | | |

† (The symbol > indicates test stopped at designated number of cycles without fracture occurring.

TABLE VIII

| No. | Phase, Analysis* |
|---|---|
| 89 | (Ti, Cr, Fe)C, >5% G, αFe. |
| 90 | (Ti, Cr, Fe)C, >5% G. |
| 91 | (Ti, Cr, Fe)C, >5% G. |
| 92 | (Ti, Cr)C, >>5% G, αFe. |
| 100 | (Zr, Hf, Ta, Ti)C, >5% G. |

*The symbol G designates graphite phase.

While the castings of the present invention broadly require only analytically 20% by weight of the metallic carbide-forming substance (as described above), certain preferred and optimum minimum limits for the individual metals have been determined for when they are used alone or in certain combinations thereof. They are as follows (by weight):

| Substance | Preferred, percent | Optimum, percent |
|---|---|---|
| Titanium alone | 40 | 69 |
| Zirconium alone | 40 | 65 |
| Hafnium alone | 45 | 60 |
| Vanadium alone | 40 | 65 |
| Niobium alone | 40 | 55 |
| Tantalum alone | 45 | 60 |
| Chromium alone | 40 | 55 |
| Molybdenum alone | 40 | 55 |
| Tungsten alone | 40 | 55 |
| Titanium-Iron | 30–0.1 (40 total) | 40–5 (60 total) |
| Titanium-Zirconium | 1–1 (40 total) | 25–25 (60 total) |
| Titanium-Chromium | 1–1 (30 total) | 20–13 (40 total) |
| Zirconium-Iron | 20–0.1 (40 total) | 40–5 (45 total) |
| Zirconium-Hafnium | 0.1–0.1 (40 total) | 5–5 (60 total) |
| Zirconium-Chromium | 10–0.1 (40 total) | 25.5 (50 total) |
| Zirconium-Silicon | 20–0.1 (40 total) | 30.5 (60 total) |
| Niobium-Tantalum | 0.1–0.1 (40 total) | 5.5 (55 total) |
| Molybdenum-Tungsten | 0.1–0.1 (40 total) | 5.5 (55 total) |
| Chromium-Iron | 15–0.1 (30 total) | 20–5 (40 total) |
| Titanium-Chromium-Iron | 30–0.1–0.1 (40 total) | 30–5–5 (60 total) |

Preferably, the total content of oxygen plus nitrogen should not exceed 10% by weight, but optimum corrosion resistance to basic oxygen furnace slag is attained by keeping this total content to no more than 5% by weight and desirably as low as 1% by weight. Minimizing the impurities to as low as 1% by weight will also assure optimum properties.

Although the term "alloy" is more commonly applied to substances composed of only two or more metals that were dissolved in each other in the molten state and then solidified, due to the similar and/or analogous nature of the castings of this invention, these castings can be said to be composed of an alloy of carbon with the above-noted metallic substances.

We claim:

1. As an article of manufacture, a fused cast refractory casting consisting essentially of at least 5% by weight free carbon in the form of a random interwoven pattern homogeneously intermingling and interlocking with substantially randomly oriented metallic carbide crystals, said casting analytically consisting essentially of: (1) carbon; (2) at least 20% by weight of metallic carbide-forming substance selected from the group consisting of titanium, zirconium, hafnium, vanadium, niobium, tantalum, chromium, molybdenum, tungsten, mixtures of the aforesaid first group of metals, and mixtures of the aforesaid first group of metals alone and at least one second group metallic element selected from the group consisting of silicon, manganese, iron, cobalt and nickel, provided the content of the aforesaid first group metals is not less than 10% by weight nor less than the content by weight of the aforesaid second group of metallic elements; (3) 0 to 15% by weight of at least one diluent selected from the group consisting of not more than 10% by weight of oxygen and not more than 10% by weight of nitrogen; and (4) a remainder, if any, of 0 to 5% by weight of other elements.

2. The fused cast refractory casting of claim 1 wherein said free carbon is at least 15% by weight.

3. The fused cast refractory casting of claim 2 wherein said metallic carbide-forming substance is at least 30% by weight, said diluent is 0 to 10% by weight and said other elements are 0 to 3% by weight.

4. The fused cast refractory casting of claim 3 wherein said metallic carbide crystals are titanium carbide and said metallic carbide-forming substance is titanium in an amount of at least 40% by weight.

5. The fused cast refractory casting of claim 3 wherein said metallic carbide crystals are zirconium carbide and said metallic carbide-forming substance is zirconium in an amount of at least 40% by weight.

6. The fused cast refractory casting of claim 3 wherein said metallic carbide crystals are hafnium carbide and said metallic carbide-forming substance is hafnium in an amount of at least 45% by weight.

7. The fused cast refractory casting of claim 3 wherein said metallic carbide crystals are vanadium carbide and said metallic carbide-forming substance is vanadium in an amount of at least 40% by weight.

8. The fused cast refractory casting of claim 3 wherein said metallic carbide crystals are niobium carbide and said metallic carbide-forming substance is niobium in an amount of at least 40% by weight.

9. The fused cast refractory casting of claim 3 wherein said metallic carbide crystals are tantalum carbide and said metallic carbide-forming substance is tantalum in an amount of at least 45% by weight.

10. The fused cast refractory casting of claim 3 wherein said metallic carbide crystals are chromium carbide and said metallic carbide-forming substance is chromium in an amount of at least 40% by weight.

11. The fused cast refractory casting of claim 3 wherein said metallic carbide crystals are molybdenum carbide and said metallic carbide-forming substance is molybdenum in an amount of at least 40% by weight.

12. The fused cast refractory casting of claim 3 wherein said metallic carbide crystals are tungsten carbide and said metallic carbide-forming substance is tungsten in an amount of at least 40% by weight.

13. The fused cast refractory casting of claim 3 wherein said metallic carbide crystals are carbide of titanium and iron, and said metallic carbide-forming substance is titanium plus iron in an amount of at least 40% by weight where titanium is at least 30% by weight and iron is at least 0.1% by weight.

14. The fused cast refractory casting of claim 3 wherein said metallic carbide crystals are carbide of titanium and zirconium, and said metallic carbide-forming substance is titanium plus zirconium in an amount of at least 40% by weight where titanium is at least 1% by weight and zirconium is at least 1% by weight.

15. The fused cast refractory casting of claim 3 wherein said metallic carbide crystals are carbide of titanium and chromium, and said metallic carbide-forming substance is titanium plus chromium where titanium is at least 1% by weight and chromium is at least 1% by weight.

16. The fused cast refractory casting of claim 3 wherein said metallic carbide crystals are carbide of zirconium and hafnium, and said metallic carbide-forming substance is zirconium plus hafnium in an amount of at least 40% by weight where zirconium is at least 0.1% by weight and hafnium is at least 0.1% by weight.

17. The fused cast refractory casting of claim 3 wherein said metallic carbide crystals are carbide of zirconium and chromium, and said metallic carbide-forming substance is zirconium plus chromium in an amount of at least 40% by weight where zirconium is at least 10% by weight and chromium is at least 0.1% by weight.

18. The fused cast refractory casting of claim 3 wherein said metallic carbide crystals are carbide of zirconium and silicon, and said metallic carbide-forming substance is zirconium plus silicon in an amount of at least 40% by weight where zirconium is at least 20% by weight and silicon is at least 0.1% by weight.

19. The fused cast refractory casting of claim 3 wherein said metallic carbide crystals are carbide of niobium and tantalum, and said metallic carbide-forming substance is niobium plus tantalum in an amount of at least 40% by weight where niobium is at least 0.1% by weight and tantalum is at least 0.1% by weight.

20. The fused cast refractory casting of claim 3 wherein said metallic carbide crystals are carbide of molybdenum and tungsten, and said metallic carbide-forming substance is molybdenum plus tungsten in an amount of at least 40% by weight where molybdenum is at least 0.1% by weight and tungsten is at least 0.1% by weight.

21. The fused cast refractory casting of claim 3 wherein said metallic carbide crystals are carbide of chromium and iron, and said metallic carbide-forming substance is chromium plus iron where chromium is at least 15% by weight and iron is at least 0.1% by weight.

22. The fused cast refractory casting of claim 3 wherein said metallic carbide crystals are carbide of titanium, chromium and iron, and said metallic carbide-forming substance is titanium plus chromium plus iron in an amount of at least 40% by weight where titanium is at least 30% by weight, chromium is at least 0.1% by weight and iron is at least 0.1% by weight.

23. The fused cast refractory casting of claim 1 wherein said free carbon is in excess of 35% by weight.

References Cited

FOREIGN PATENTS 504,543   4/1939   Great Britain.

OTHER REFERENCES

Bloom et al., The System Chromium-Carbon, Jr. Metals, January 1950, pp. 41–46.

TOBIAS E. LEVOW, *Primary Examiner.*

J. E. POER, *Assistant Examiner.*